(12) United States Patent
Sanossian et al.

(10) Patent No.: US 10,776,495 B2
(45) Date of Patent: Sep. 15, 2020

(54) SYSTEMS AND METHODS FOR ATTRIBUTING SECURITY VULNERABILITIES TO A CONFIGURATION OF A CLIENT DEVICE

(71) Applicant: Microsoft Technology Licensing, LLC, Redmond, WA (US)

(72) Inventors: Hermineh Sanossian, Kirkland, WA (US); Tushar Suresh Sugandhi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/976,524

(22) Filed: May 10, 2018

(65) Prior Publication Data
US 2019/0347423 A1 Nov. 14, 2019

(51) Int. Cl.
| | |
|---|---|
| G06F 21/00 | (2013.01) |
| G06F 21/57 | (2013.01) |
| G06F 21/56 | (2013.01) |
| H04L 12/24 | (2006.01) |
| G06F 21/55 | (2013.01) |
| H04L 29/06 | (2006.01) |

(52) U.S. Cl.
CPC .......... *G06F 21/577* (2013.01); *G06F 21/554* (2013.01); *G06F 21/56* (2013.01); *H04L 41/0853* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 2005/0038827 | A1* | 2/2005 | Hooks | G06F 11/1451 |
| 2015/0302196 | A1* | 10/2015 | Kannan | G06F 21/562 |
| | | | | 726/23 |
| 2016/0057164 | A1* | 2/2016 | Maeng | H04L 63/10 |
| | | | | 726/25 |

OTHER PUBLICATIONS

"International Search Report and Written Opinion Issued in PCT Application No. PCT/US19/030502", dated Jul. 26, 2019, 10 Pages.
Astala, et al., "Multiclass Decision Forest", Retrieved From https://docs.microsoft.com/en-us/azure/machine-learning/studio-module-reference/multiclass-decision-forest, Jan. 24, 2018, 6 Pages.
Astala, et al., "Tune Model Hyperparameters", Retrieved From https://msdn.microsoft.com/en-us/library/azure/dn905810.aspx, Jan. 22, 2018, 11 Pages.
Brower, et al., "Device HealthAttestation CSP", Retrieved From https://docs.microsoft.com/en-us/windows/client-management/mdm/healthattestation-csp#dha-report-example, Jun. 26, 2017, 32 Pages.

* cited by examiner

*Primary Examiner* — Andrew J Steinle
(74) *Attorney, Agent, or Firm* — Arent Fox LLP

(57) ABSTRACT

This disclosure relates to systems, devices, and methods for receiving security configuration information and malware state information for a plurality of client devices, the security configuration information comprising identification of at least one of security parameters, hardware configurations, or software configurations of each of the plurality of client devices, and the malware state information comprising identification of at least one or more types of malware on each of the plurality of devices. The security configuration information and malware state information may be analyzed to identify which client devices from the plurality of devices have a security configuration that places the identified client devices in a vulnerable security state.

20 Claims, 14 Drawing Sheets

| SUMMARY | HBI DEVICES | MBI DEVICES | LBI DEVICES |
|---|---|---|---|
| Device Distribution by Business Impact<br>■ HBI Devices<br>✱ HBI Devices<br>★ HBI Devices | 1020 — 10%<br>1030 —<br>1040 — 2.1K devices | 1020 —<br>1030 — 25%<br>1040 — 5.3K devices | 1020 —<br>1030 — 65%<br>1040 — 13.7K devices |
| Filters... | | | |
| Group | Secureboot Disabled | 323 | Defender def expired | 323 | Reboot required | 323 |
| OSVERSION | Bitlocker turned off | 112 | OS not patched | 112 | Defender crashed | 112 |
| OSBUILD | Defender not turned on | 94 | Last quick scan > 7 days | 94 | Defender not patched | 94 |
| MANUFACTURER | Firewall turned off | 78 | Firewall turned off | 78 | DEP Policy not present | 78 |
| MODEL | ... | | ... | | ... | |
| COMPUTER | ... | | ... | | ... | |
| PRERELEASE | | | | | | |

*FIG. 10*

| SUMMARY | COMPROMISED HIGH RISK DEVICES | | COMPROMISED MEDIUM RISK DEVICES | | COMPROMISED LOW RISK DEVICES | |
|---|---|---|---|---|---|---|
| Total Compromised Devices in an Enterprise | % Compromised devices under category High Risk Devices | | % Compromised devices under category Medium Risk Devices | | % Compromised devices under category Low Risk Devices | |
| Filters... | Parameters observed on compromised devices | | | | | |
| Group | Secureboot Disabled | 323 | Defender def expired | 323 | Reboot required | 323 |
| OSVERSION | Bitlocker turned off | 112 | OS not patched | 112 | Defender crashed | 112 |
| OSBUILD | Defender not turned on | 94 | Last quick scan > 7 days | 94 | Defender not patched | 94 |
| MANUFACTURER | Firewall turned off | 78 | Firewall turned off | 78 | DEP Policy not present | 78 |
| MODEL | ... | | ... | | ... | |
| COMPUTER | ... | | ... | | ... | |
| PRERELEASE | ... | | ... | | ... | |
| | Top compromised devices | | | | | |
| | Device Name | # harmful items detected | Device Name | # harmful items detected | Device Name | # harmful items detected |
| | Device#1 | 50 | Device#6 | 20 | Device#11 | 5 |
| | Device#2 | 45 | Device#7 | 18 | Device#12 | 4 |
| | Device#3 | 40 | Device#8 | 16 | Device#13 | 3 |
| | Device#4 | 35 | Device#9 | 14 | Device#14 | 2 |
| | Device#5 | 30 | Device#10 | 12 | Device#15 | 1 |

*FIG. 11*

SYSTEMS AND METHODS FOR ATTRIBUTING SECURITY VULNERABILITIES TO A CONFIGURATION OF A CLIENT DEVICE

BACKGROUND

Existing threat protection solutions take into account the activities happening on a single machine, such as what software applications may be currently running or had been run in the past, which user may be logged in, which universal resource locator (URL) may be currently visited or visited in the past, etc. However, in most instances, these threat protection solutions do not take into account the device configuration or security states of the machine. And even when the threat protection solutions do consider the device configuration or security state of the machine, the underlying information cannot be considered trustworthy as the underlying information may not be verified by, or attested to, by another independent trustworthy third party device. Thus, in some instances, the threat protection solutions may be analyzing a spoofed device configuration if the machine has been compromised.

Thus, there exists a need for improvement in assessing security vulnerabilities of machines.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method for controlling security risks on client devices. The method may include receiving security configuration information for a plurality of client devices. In some implementations, the security configuration information may include identification of at least one of security parameters, hardware configurations, or software configurations of each of the plurality of client devices. The method may also include receiving malware state information for each of the plurality of client devices. In some implementations, the malware state information may include identification of at least one or more types of malware on each of the plurality of devices. The method may also include analyzing the security configuration information and the malware state information for each client device to identify which client devices from the plurality of devices have a security configuration that places the identified client devices in a vulnerable security state.

In another example, a computer device for controlling security risks is disclosed. The computer device may include a memory to store data and instructions and a processor in communication with the memory. The processor may be configured to execute instructions to receive security configuration information for a plurality of client devices. In some implementations, the security configuration information may include identification of at least one of security parameters, hardware configurations, or software configurations of each of the plurality of client devices. The processor may be configured to execute instructions to receive malware state information for each of the plurality of client devices. In some implementations, the malware state information may include identification of at least one or more types of malware on each of the plurality of devices. The processor may be configured to execute instructions to analyze the security configuration information and the malware state information for each client device to identify which client devices from the plurality of devices have a security configuration that places the identified client devices in a vulnerable security state.

Another example implementation relates to computer-readable medium storing instructions executable by a computer device. The instructions may include code for receiving security configuration information for a plurality of client devices. In some implementations, the security configuration information may include identification of at least one of security parameters, hardware configurations, or software configurations of each of the plurality of client devices. The instructions may include code for receiving malware state information for each of the plurality of client devices. In some implementations, the malware state information may include identification of at least one or more types of malware on each of the plurality of devices. The instructions may include code for analyzing the security configuration information and the malware state information for each client device to identify which client devices from the plurality of devices have a security configuration that places the identified client devices in a vulnerable security state.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIGS. 9-12 are examples of sample reports in accordance with implementations of the present disclosure;

DETAILED DESCRIPTION

This disclosure relates to systems, devices, and methods for managing security threats, such as malware on client devices, by attributing security vulnerabilities associated with malware to one or more device configurations of a client device and reporting on and/or updating device configurations to avoid the security risk. In particular, the system includes a security threat model, such as a trained machine learning model, which analyzes device configuration information and malware state information for a plurality of devices to identify corresponding at-risk client devices.

Figure 1:
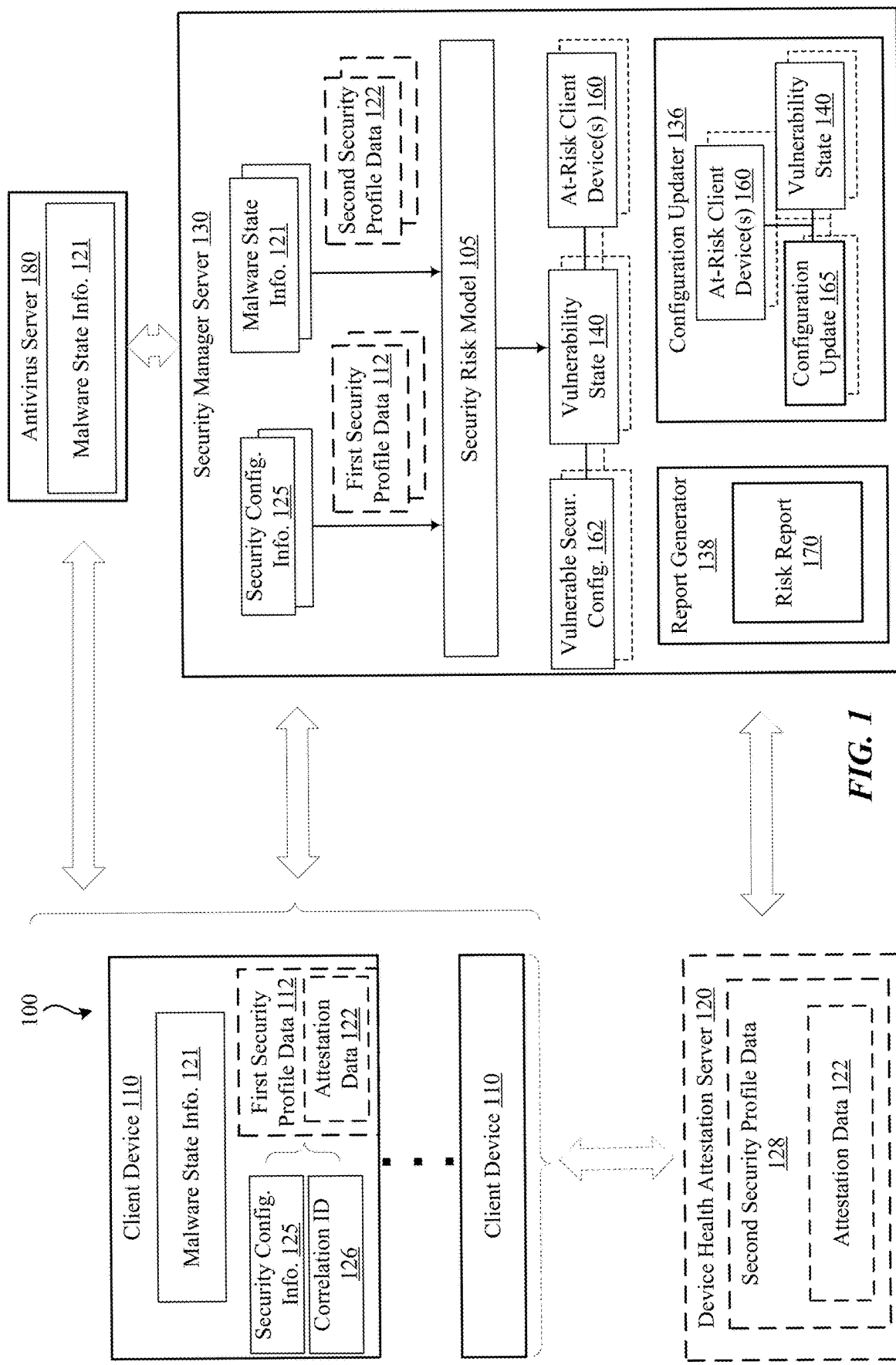
FIG. 1 is a schematic diagram of an example implementation of a network for attributing security vulnerabilities to a configuration of a client device.

Referring to FIG. 1, in an example implementation, a network 100 for attributing security vulnerabilities to a configuration of a client device and reducing security risks may include a plurality of client devices 110 that provide security configuration information 125 to a security manager server 130 and an antivirus server 180 that provides malware state information 121 for each of the plurality of client devices 110 to the security manager server 130. The security manager server 130 may use the security configuration information 125 and the malware state information 121 to identify at-risk client devices 160. For example, the security configuration information 125 may include, but is not limited to, information on a security configuration including one or more security parameters, hardware features, software features, and/or firmware features of the client device, or any other parameter, feature, or characteristic of the client device that may be used to identify a security configuration and/or measure security-related properties of a client device.

In some implementations, the antivirus server 180 may receive the malware state information 121 from each of the plurality of client devices 110. The malware state information 121 may include, but is not limited to, types of malware files present on the client device, a number of malware files present on the client device, a period of time the malware files have been present on the client device, and/or any other type of malware-related or infection-related information. In particular, the security manager server 130 includes a security risk model 105 configured to identify one or more vulnerable security configurations 162 each having a corresponding vulnerable security state 140 based on analyzing and correlating the security configuration information 125 and the malware state information 121. The security risk model 105 may be a trained machine learning model, such as based on supervised and/or unsupervised training using an algorithm such as, but not limited to, multi-class decision tree, deep neural network, or temporal-based algorithms. The one or more vulnerable security configurations 162 may be different sets of parameters, features, configurations, etc., such as respective subsets of the security configuration information 125, identified as contributing to a corresponding one or more security risks based on being associated with the presence of one or more malware according to the correlations performed by the security risk model 105. The vulnerable security state 140 may be an indicator of a level of security risk or vulnerability to infection by malware according to the correlations performed by the security risk model 105. For example, the vulnerable security state 140 may be a number or percentage associated with a confidence in predicted security risk, or a word describing a level (which may be a range of the number or percentage) of the security risk, e.g., low, medium, high. Additionally, the security risk model 105 can compare the vulnerable security configurations 162 to the security configuration information 125 of each of the plurality of client devices 110 to identify matches, and hence to identify which client devices from the plurality of devices 110 have a security configuration 125 that places the identified client devices in the vulnerable security state 140. That is, the security risk model 105 may compare the security configuration information 125 for each client 110 device to known security configurations, e.g., vulnerable security configurations 162, that place the client device in the vulnerable security state. In this way, the security risk model 105 may identify which client device(s) of the plurality of devices 110 are at-risk client devices 160 based on having security configuration information 125 that matches at least one of the vulnerable security configurations 162. The security manager server 130 may further include a report generator 138 configured to generate and output, e.g., to a display or a printer, a risk report 170 that includes the identified client devices. Alternatively, or in addition, the security manager server 130 may further include a configuration updater component 136 operable to identify, for each at-risk client device 160 and each vulnerable security configuration 162, a configuration update 165 that includes a change in one or more parameters, features, or other characteristics of the security configuration information 125 to reduce or avoid the security threat associated with the corresponding vulnerable security configuration 162 and vulnerable security state 140. Further, in some implementations, the configuration updater component 136 may be operable to automatically, or in response to a manual trigger, initiate transmitting each respective configuration update 165 to each at-risk client device 160.

In some implementations, in order to avoid the possibility of tampering with the information by malware, the security manager server 130 may obtain a secure form of the security configuration information 125. For example, each client device 110 may include a secure component, such as a trusted platform module (TPM), having secure code that is operable to collect the security configuration information 125 and validate this information via secure message exchanges with another trusted device (e.g., trusted by client device 110 and by security manager server 130), such as a device health attestation server 120. For instance, each client device 110 and device health attestation server 120 may communicate using the device health attestation protocol available from Microsoft Corporation, Redmond, Wash. In this case, the security configuration information 125 may be captured in first security profile data 112 on each client device 110, and a duplicate copy as second security profile data 128 on the device health attestation server 120. Further, the first security profile data 112 and the second security profile data 128 may both include attestation data 122 that validates an authenticity of the first security profile data 112 and the second security profile data 128. The attestation data 122 may include a unique code or identifier that allows the first security profile data 112 and the second security profile data 128 to be matched and verified against one another. As such, in this implementation, the security manager server 130 may receive the first security profile data 112 from the plurality of client devices 110, and the second security profile data 128 from the device health attestation server 120, and then compare the corresponding attestation data 122 to ensure the information is valid before initiating processing by the security risk model 105. Further details of this implementation will be discussed below. Thus, security manager server 130 may be operable to monitor, control, and/or reduce security risks in the form of malware infections in the plurality of client devices 110.

Figure 2:
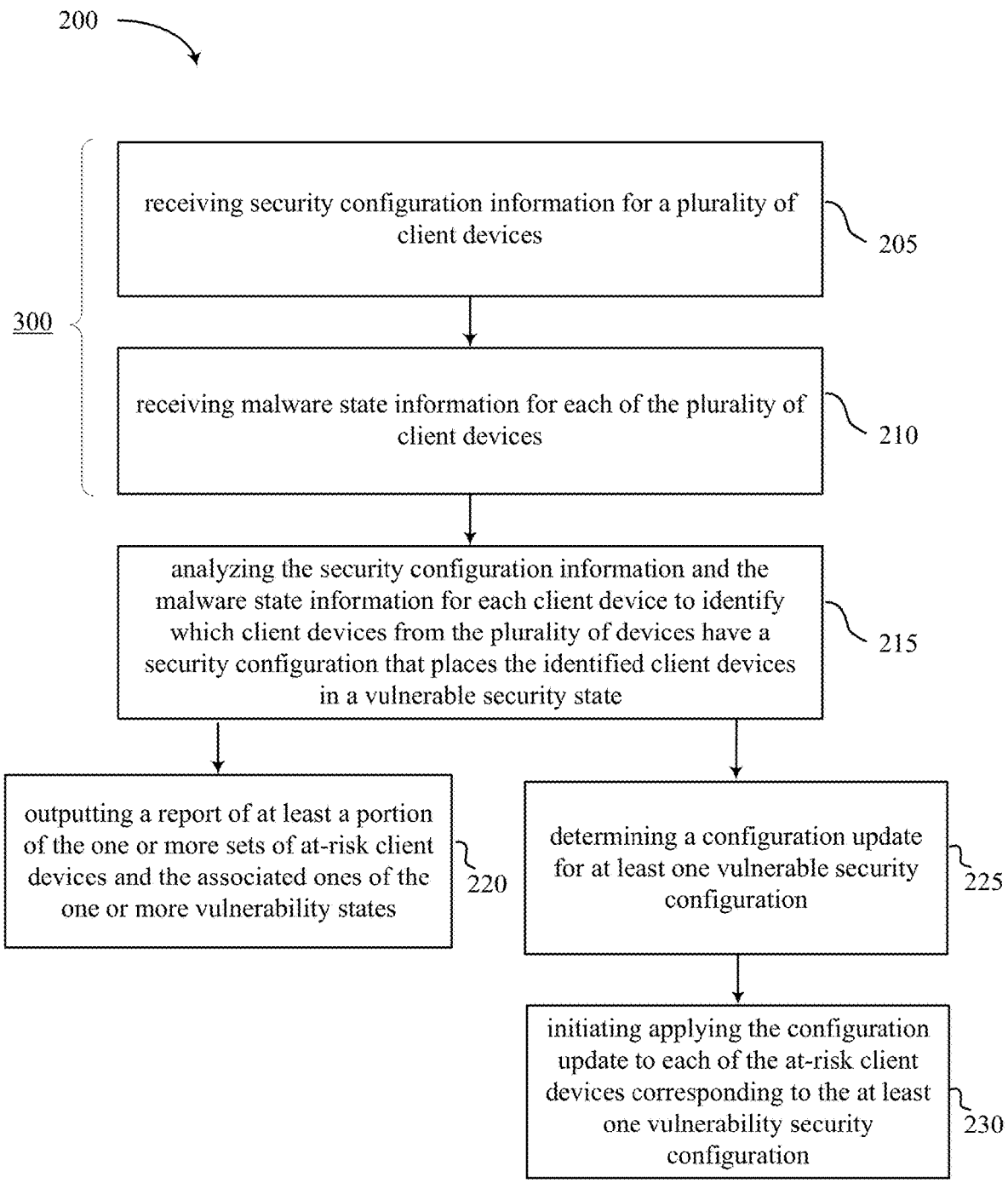
FIG. 2 is a flowchart of an example method for attributing security vulnerabilities to a configuration of a client device in accordance with an implementation of the present disclosure.

Referring now to FIG. 2, an example method 200 for attributing security vulnerabilities to a configuration of a client device that may be used by the security manager sever 130 (FIG. 1) may include one or more actions performed by one or more components of the security manager server 130. It should be understood that the security manager server 130 may be configured in other manners to perform these actions. Additional references may be made to FIGS. 3-8, which include additional or related portions of method 200 or architectural components of security manager server 130, client device 110, and/or device health attestation server 120 used in conjunction with performing method 200.

At 205, method 200 includes receiving security configuration information 125 for a plurality of client devices 110, the security configuration information 125 comprising identification of at least one of security parameters, hardware configurations, or software configurations of each of the plurality of client devices 110. For example, in an implementation referring to FIG. 1 and FIG. 5, the security manager server 130 and/or a security risk correlator component 134 may receive the security configuration information 125 from the plurality of client devices 110 and/or the attestation server 120. For instance, the security manager server 130 may establish a wired or wireless communication link, e.g., directly or indirectly through a local or wide area network, and may periodically and/or on request receive the security configuration information 125 from the plurality of client devices 110 and/or the attestation server 120.

At 210, method 200 includes receiving malware state information 121 for each of the plurality of client devices 110, the malware state information 121 comprising identification of at least one or more types of malware on each of the plurality of devices. For example, in an implementation referring to FIG. 1 and FIG. 5, the security manager server 130 and/or a security risk correlator component 134 may receive the malware state information 121 for the plurality of client devices 110 from the antivirus server 180. For instance, the security manager server 130 may establish a wired or wireless communication link, e.g., directly or indirectly through a local or wide area network, and may periodically and/or on request receive the malware state information 121 for the plurality of client devices 110 from the antivirus server 180.

Figure 7:
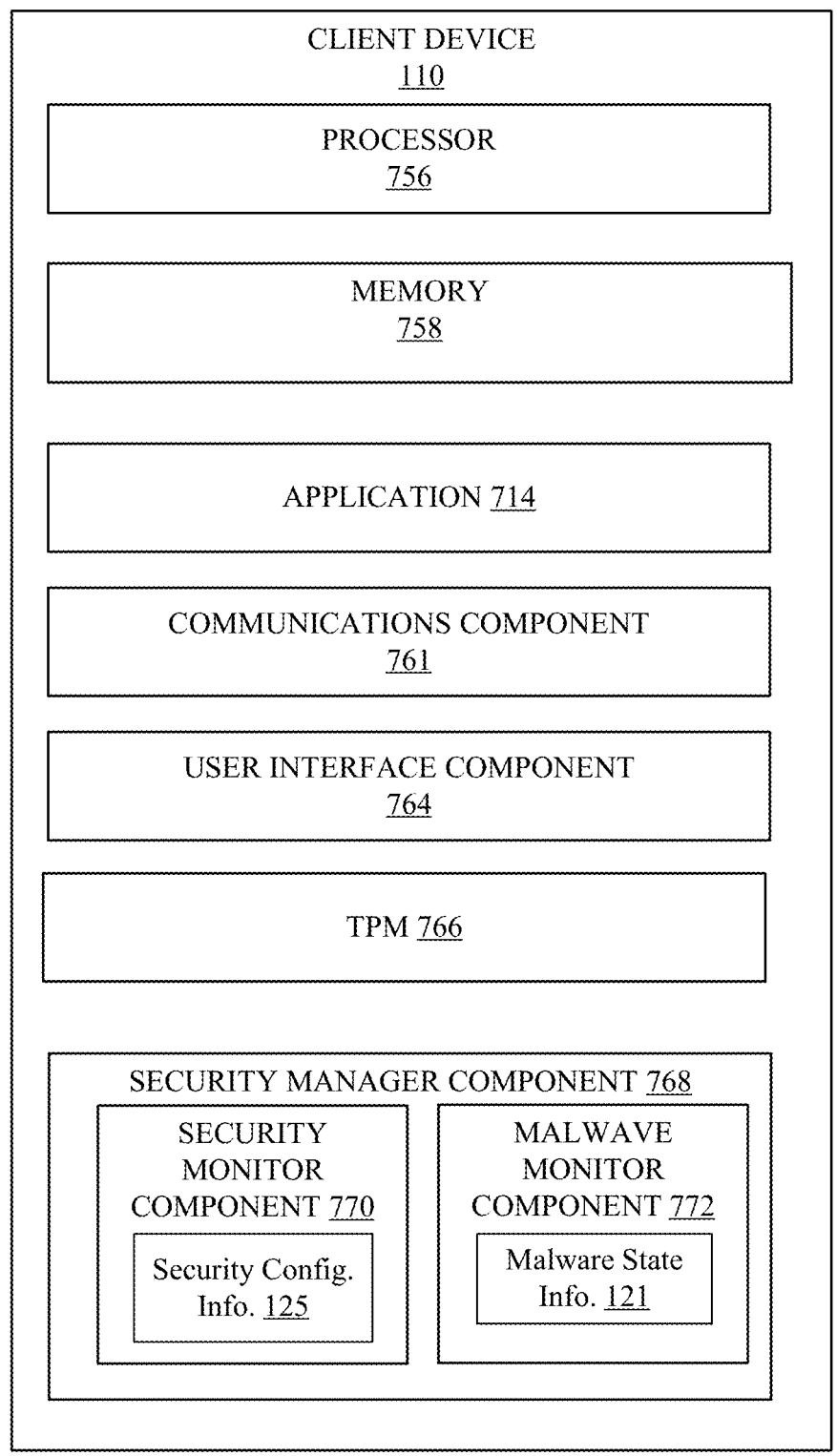
FIG. 7 is a schematic block diagram of an example client device in accordance with an implementation of the present disclosure.

In an implementation, additionally referring to FIG. 7, each client device 110 may include a security manager component 768 that controls the security configuration information 125. For instance, the security manager component 768 may include a security configuration component 770 that manages the security configuration information 125. Examples of the security configuration component 770 may include, but are not limited to, secure boot software, Device Health Attestation™ security software, such as BitLocker™ security software, etc.

Figure 3:
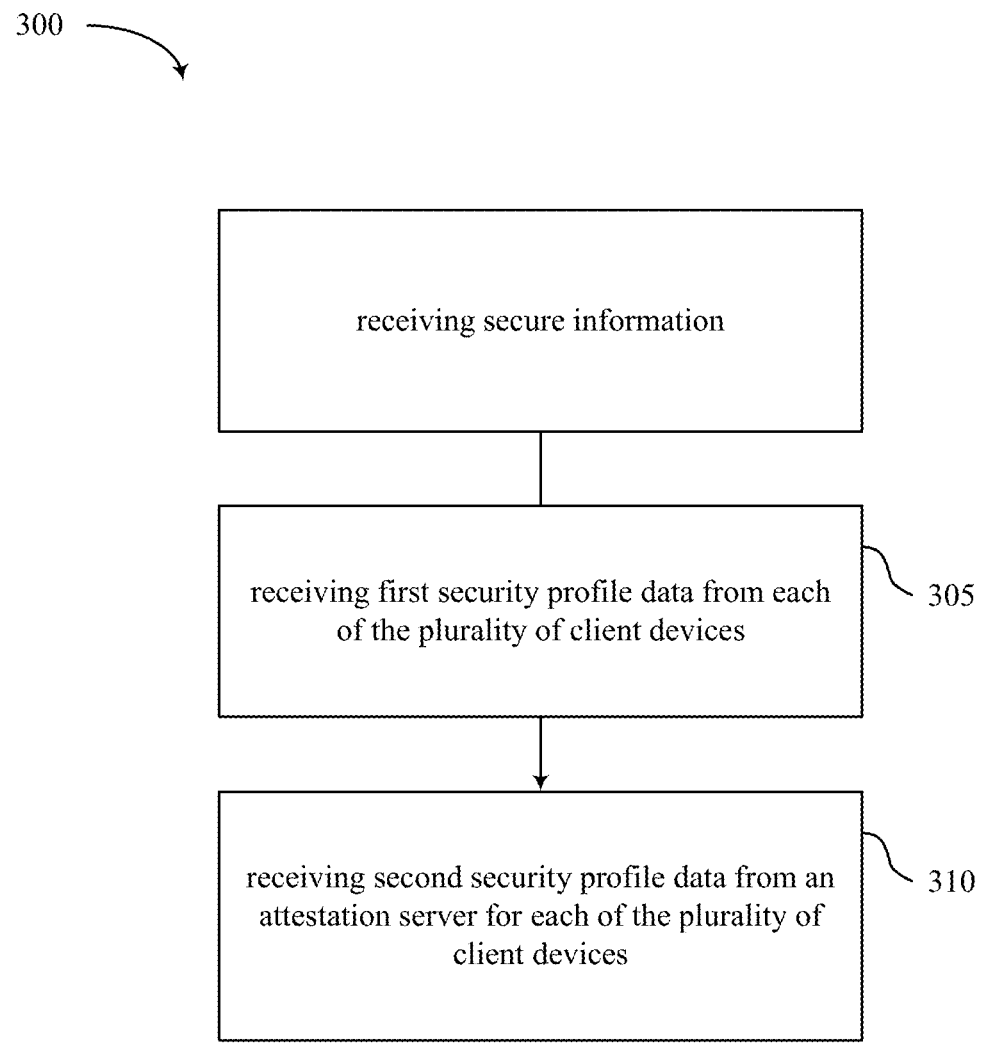
FIG. 3 is a flowchart of an example method for receiving secure information in accordance with an implementation of the present disclosure.

Optionally, at 300 and with further reference to FIG. 3, at least one of receiving the security configuration information 125 (at 205) and receiving the malware state information 121 (at 210) may further include receiving secure information.

Figure 5:
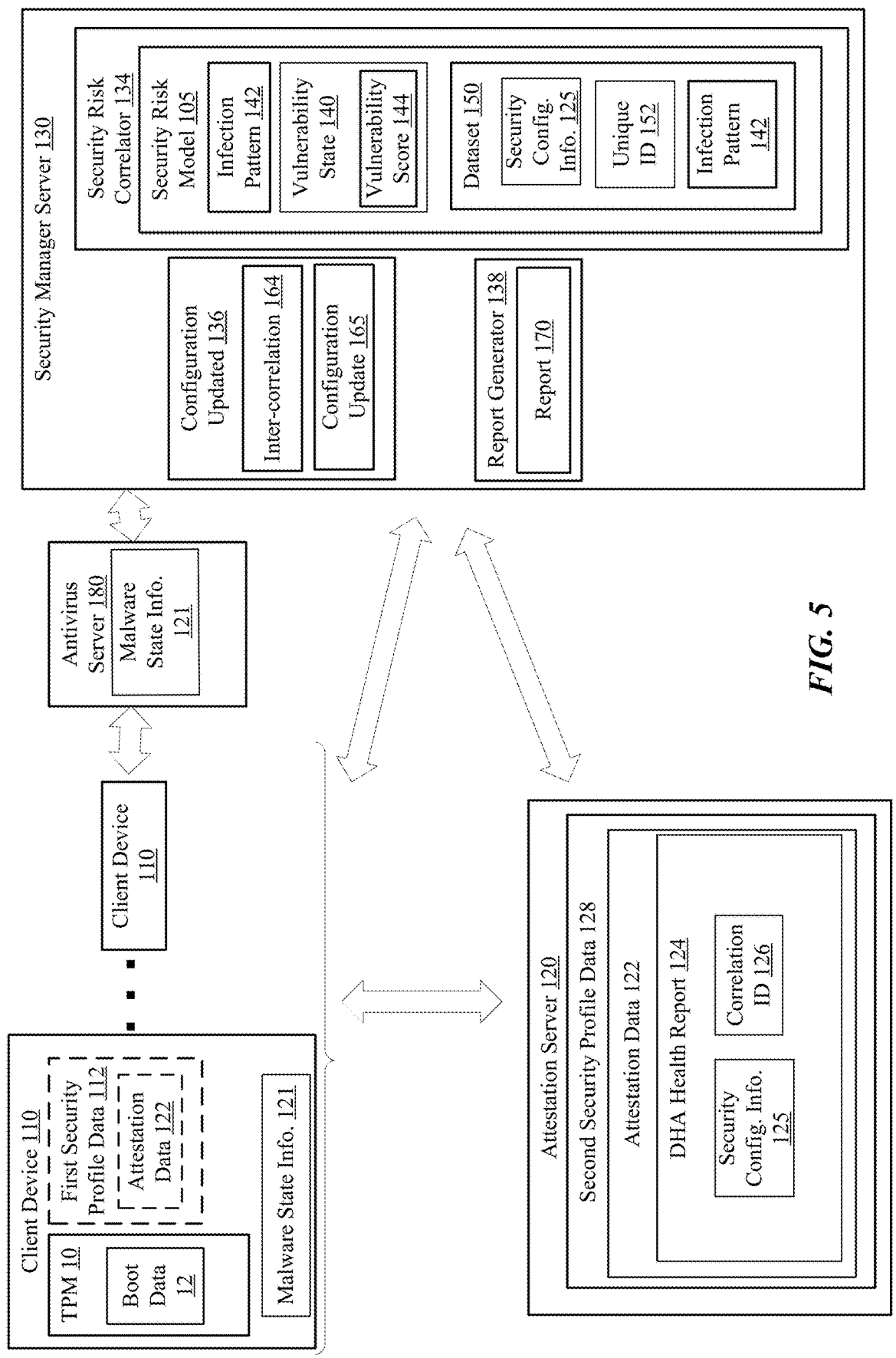
FIG. 5 is a schematic diagram of another example implementation of a network for attributing security vulnerabilities to a configuration of a client device.

For example, at 305, receiving secure information includes receiving first security profile data 112 from each of the plurality of client devices 110, wherein the first security profile data 112 includes at least one of the secure configuration information 125. Further, the first security profile data 112 may be based on a message exchange by each of the plurality of client devices 110 with the attestation server 120 and may be an encrypted, client-side version of the at least one of the security configuration information 125. For example, in an implementation, each of the plurality of client devices 110 may initiate an exchange with the attestation server 120. For example, during each boot, a TPM 10 (as shown in FIG. 5) of each client device 110 stores boot data 12 in an encrypted format hashed by a private key sealed inside the TPM 10, and each of the plurality of client devices 110 sends the boot data 12 to the attestation server 120. In turn, the attestation server 120 uses the boot data 12 and verifies that it matches a value computed from individual security parameters on the client device 110. Once the attestation server 120 determines that the boot data 12 is trustworthy, the attestation server 120 may encrypt the boot data 12 and send the boot data 12 back to a respective client device 110, which may then transmit the encrypted boot data as first security profile data 112 to the security manager server 130. In some implementations, the plurality of client devices 110 may be device health attestation (DHA) enabled devices, such as a mobile device, a desktop, a laptop, a tablet, a server, etc., and the boot data 12 may be DHA boot data. It should be understood by those of ordinary skill in the arts that these are merely examples of DHA enabled devices, and that other DHA enabled devices are further contemplated in accordance with aspects of the present disclosure.

Further, for example, at 310, receiving secure information may additionally or alternatively include receiving second security profile data 128 from the attestation server 120 for each of the plurality of client devices 110. Further, the second security profile data 128 includes at least one of the security configuration information 125 for each of the plurality of client devices 110. Also, the second security profile data 128 is based on a message exchange by the attestation server 120 with each of the plurality of client devices 110 and may be an encrypted, server-side version of the at least one of the security configuration information 125 and the malware state information 121. For example, in an implementation, after receiving the boot data 12 from one of the plurality of client devices 110, the attestation server 120 verifies that the boot data 12 matches a value computed from individual security parameters on the client device 110. Once the attestation server 120 determines that the boot data 12 is trustworthy, the attestation server 120 may encrypt the boot data 12 and send the boot data 12 as the second security profile data 128 to the security manager server 130.

In some implementations, the first and second security data profiles 112, 128 may each include the attestation data 122, which may include DHA report 124. In some implementations, the DHA report 124 may include the security configuration info 125 and a correlation identifier (ID) 126, which may be used to correlate data between each of the plurality of client devices 110 and the attestation server 120. In some instances, the DHA report 124 may be generated after reviewing the boot data 12 of each respective client device 110. In this way, even if a client device 110 were infected with operating systems kernel level malware or a rootkit, the attestation server 120 may receive the boot data of each client device 110 so that the security parameters, etc., of the client device 110 cannot be easily spoofed. In some implementations, the first and second device security profile data 112, 128, may be provided to the security manager server 130 using a universal telemetry client (UTC) that implements a client logging library (CLL). In some implementations, UTC may be a software running on each of the plurality of client devices, which may collect configuration information of each client device, e.g., random access memory (RAM) size, machine type, hard disk size/ type processor type/size software programs installed on the client, etc. In further implementations, the CLL may be one or more application programming interfaces that log various attributes and events on the client devices 110.

The attestation server 120 may use the security configuration information 125 including one or more security parameters, hardware features, software features, and/or firmware features of the client device 110 to measure security properties of each of the client device's boot operations. The one or more device security parameters may include, but not limited to, one or more security/encryption features that may be hardware, software, or a combination of both, one or more features of an operating system used during booting of the one or more client devices, one or more operating states of the plurality of client devices, and/or one or more operating systems used to install, deploy, and repair the plurality of client devices 110. The hardware features may include the TPM 10, an amount of memory of the client device, an amount of storage space of the client device, a type of client device, a connection of the client device to the cloud, a location of the client device, etc. The software features may include what type of software applications are operating on the client device, etc. These device security parameters, hardware features, software features, and firmware features are some examples, and it should be understood by those of ordinary skill in the arts that other parameters/features are also contemplated in accordance with implementations of the present disclosure. In some implementations, the device configuration may be collected from client devices that have provided consent or opted in to the processes for attributing security vulnerabilities to the configuration of the device.

In some implementations, the first device security profile information 112 may also include, but is not limited to, a unique identifier of the client device, an error code for a result of an operation, an information bit mask, which may be a bit vector of various detailing attributes for a TPM state of the client device, a nonce length, which may be an integer value based on whether the TPM version implemented on the client device, a nonce value, which may be a random value used to prevent replay attacks, a timestamp indicating when the nonce value was generated for the DHA transaction, and a version of the DHA report 124 being sent by the client device 110. The second device security profile information 128 may also include, but is not limited to, an error code for the result of the operation.

Referring back to FIG. 2, at 215, method 200 includes analyzing the security configuration information 125 and the malware state information 121 for each client device 110 to identify which client devices from the plurality of devices 110 have a security configuration that places the identified client devices in a vulnerable security state 140. For example, in an implementation that additionally refers to FIG. 5, the security manager server 130 and/or security risk correlator 134 executes the security risk model 105 to identify which client devices 110 have a security configuration that places the identified client devices in the vulnerable security state 140. That is, the security risk model 105 may identify one or more at-risk client devices 160.

The security risk model 105 is operable to analyze the security configuration information 125 and the malware state information 121 for each of the plurality of client devices 110. In some implementations, each at-risk client device 160 comprises security configuration information 125 that matches, at least in part, one or more vulnerable security configurations 162. For example, in an implementation, upon receipt of the security configuration information 125 and the malware state information 121, security risk model 105 may determine the vulnerable security state 140 of each the plurality of client devices 110 based on the security configuration information 125 and the malware state information 121. In other words, security risk model 105 compares the security configuration information 125 and the malware state information 121 of each client device with combinations of security configuration information and malware state information known or predicted to be associated with one or more vulnerable security states 140. Further, the security risk model 105 can classify the vulnerable security state 140, e.g., based on a score, and determine whether the client device 110 has, for example, a high level of vulnerability, a moderate level of vulnerability, a low level of vulnerability, etc., where each level of vulnerability may correspond to a range of probabilities of a given configuration will result in a security risk.

Figure 4:
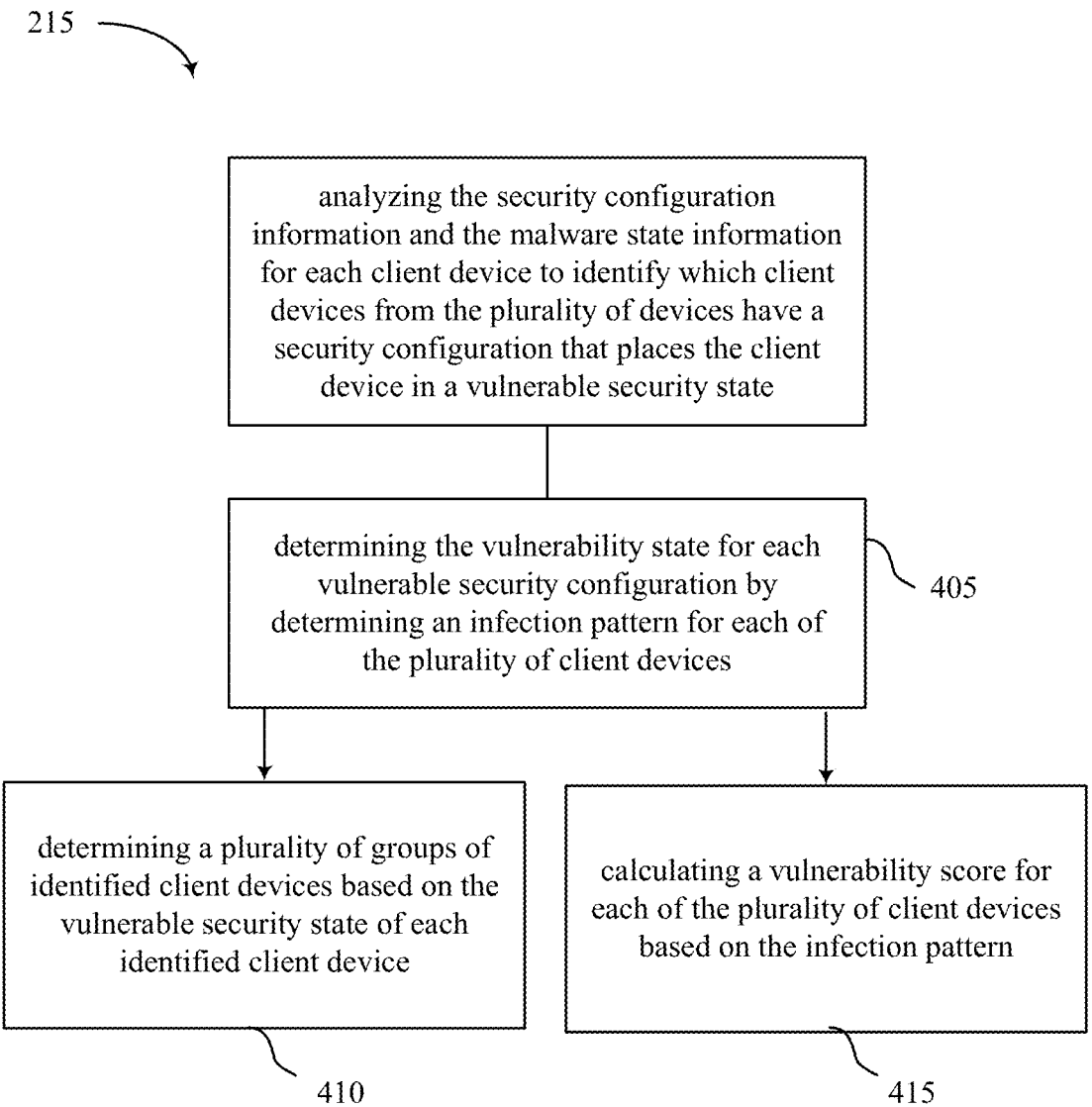
FIG. 4 is a flowchart of an example method for determining one or more sets of at-risk client devices in accordance with an implementation of the present disclosure.

In some optional implementations, additionally referring to FIG. 4, at 405, analyzing the security configuration information 125 and the malware state information at 215 optionally may further include or be based on determining the vulnerable security state 140 for each vulnerable security configuration 162 by determining an infection pattern 142 for each of the plurality of client devices 110 based on one or more of a number of types of malware files present on each client device, a number of malware files present on each client device, or a period of time the malware files have been present on each client device, and associating one or more sets of infection patterns 142 with a corresponding one or more vulnerable security states 140. For example, in an implementation, the security manager server 130 and/or security risk correlator 134 executing the security risk model 105 may use the infection pattern 142 of each of the plurality of client devices 110 to identify the at-risk client devices 160 based on the vulnerable security state 140 of each client device 110.

To achieve this, the security manager server 130 and/or security risk correlator 134 may, for example, execute the security risk model 105 to group the plurality of client devices 110 based on a number of unique malware files m, a number of malware families f, and a number of days malware files were detected on a client device dmax, which may be based on a period for determining the pattern of infection 142. In some implementations, the security manager server 130 and/or security risk correlator 134 may periodically, e.g., daily, weekly, and/or and monthly, determine the pattern of infection 142 of each the plurality of client devices 110. For example, when determining the pattern of infection 142 daily, dmax may be 1, when determining the pattern of infection 142 weekly dmax may be 7, and when determining the pattern of infection 142 monthly, dmax be 28. Thus, for each of the plurality of client devices, the following may be calculated daily, weekly, and/or monthly:

the number of unique malware files m;
the number of malware families f; and
a number of days files were detected machine dmax.

In some aspects, the security manager server 130 and/or security risk correlator 134 may calculate a range for the number of unique malware files mr and a range for the number of malware families fr based on the number of unique malware files m and the number of malware families f, respectively. In some implementations, the infection pattern 142 may be illustrated using a unique identifier, for example, a four-digit number. Although a four-digit number is described herein, it should be understood by those of ordinary skill in the arts that other unique identifiers are also contemplated in accordance with aspects of the present disclosure.

In some implementations, a most significant digit of the unique identifier may be based on the range for the number of unique malware files mr, a second digit of the unique identifier may be based on the range for the number of malware families fr, a third digit the unique identifier may be based on the number of days files were detected machine dmax, and a least significant digit may be based on whether a client device is a shared global unique identifier device ("GUID device").

The range for the number of unique malware files mr and the range for the number of malware families fr, may each be rated on a scale of 1 to 5, with 1 indicating a low number of files or family names, respectively, and 5 indicating a large number of files or family names, respectively. In some implementations, devices with ranges mr and fr falling below a first threshold may be rated 1, devices with ranges mr and fr falling between the first threshold and a second threshold may be rated 2, devices with ranges mr and fr falling between the second threshold and a third threshold may be rated 3, devices with ranges mr and fr falling between the third threshold and a fourth threshold may be rated 4, and devices with ranges mr and fr falling above the fourth threshold may be rated 5. The number of days files were detected machine dmax may be rated on a scale of 1 to 3, with 1 indicating a low number of days and 3 indicating a large number of days. For example, in some implementations, devices with the number of days files were detected machine dmax falling below a first threshold may be rated 1, devices with the number of days files were detected machine dmax falling between the first threshold and a second threshold may be rated 2, devices with the number of days files were detected machine dmax between the second threshold and a third threshold may be rated 3. The least significant digit may have either a value of 1 indicating that the client device is a global unique identifier (GUID) device or a value of 0 indicating that the client device is not a GUID device, or vice-versa. That is, the least significant digit may be used to identify whether the client device is a GU ID device.

In a further optional implementation, at 410, identifying the client devices further comprises determining a plurality of groups of identified client devices based on the vulnerable security state of each identified client device. In some implementations, grouping identified client devices may be based on the infection pattern 142 of the client device matching with one or more infection patterns associated with the one or more vulnerable security states. For example, in an implementation, the security manager server 130 and/or security risk correlator 134 may execute the security risk model 105 to create a dataset 150 including the security configuration information 125 of each of the plurality of client devices 110, a unique identifier 152 of each of the plurality of client devices 110, and the infection pattern 142 of each of the plurality of client devices 110. In some implementations, this may be achieved by merging the first and second security data profiles 112, 128 based on the correlation ID 126. In cases where the first and second security data profiles 112, 128 may initially only include the security configuration information 125, the data merger 134 may also merge the first and/or security profile data 112 and/or 128 with the malware state information 121 from the antivirus server 180 to uniquely identify each client device 110.

In some implementations, the security manager server 130 and/or security risk correlator 134 may apply a machine learning algorithm, e.g., security risk model 105, to the dataset 150 to determine a correlation 154 between the security configuration information 125 of each of the plurality of client devices 110 and respective vulnerable security states 140. As an example dataset is listed below as Table I. In some implementations, as listed in Table I, the dataset 150 may include one or more security parameters of each of the client devices, hardware features of each client device, one or more other device-specific parameters (e.g., a country in which the device is located), and the infection pattern 142.

TABLE I

| | DHA Device Security Fields | | | | | Device Census Fields | Defender Fields Infection |
| --- | --- | --- | --- | --- | --- | --- | --- |
| AIKPresent | Bitlocker Status | SecureBoot Enabled | CodeIntegrity Enabled | ELAMDriver Loaded | VSM Enabled | CountryName | Pattern Score |
| TRUE | 0 | TRUE | TRUE | TRUE | TRUE | Norway | 5431 |
| TRUE | 1 | TRUE | TRUE | TRUE | TRUE | Norway | 5431 |
| TRUE | 0 | TRUE | TRUE | TRUE | FALSE | New Zealand | 1111 |
| TRUE | 0 | TRUE | TRUE | TRUE | FALSE | New Zealand | 1111 |
| FALSE | 1 | FALSE | TRUE | TRUE | FALSE | United Kingdom | 1111 |
| FALSE | 1 | FALSE | TRUE | TRUE | FALSE | United Kingdom | 1111 |
| TRUE | 1 | TRUE | TRUE | TRUE | FALSE | United Kingdom | 1110 |
| TRUE | 0 | TRUE | TRUE | TRUE | TRUE | United States | 1111 |
| TRUE | 0 | TRUE | TRUE | TRUE | TRUE | United States | 1111 |
| TRUE | 0 | TRUE | TRUE | TRUE | TRUE | India | 1111 |
| FALSE | 0 | TRUE | TRUE | TRUE | FALSE | United States | 1110 |
| TRUE | 0 | TRUE | TRUE | TRUE | TRUE | United States | 3221 |
| TRUE | 0 | FALSE | TRUE | TRUE | FALSE | Israel | 2211 |
| TRUE | 0 | FALSE | TRUE | TRUE | FALSE | Israel | 2211 |
| TRUE | 1 | TRUE | TRUE | TRUE | TRUE | United States | 1111 |
| TRUE | 0 | TRUE | TRUE | TRUE | FALSE | France | 3321 |
| TRUE | 1 | TRUE | TRUE | TRUE | FALSE | United States | 5431 |
| TRUE | 0 | TRUE | TRUE | TRUE | TRUE | United States | 5431 |
| TRUE | 0 | TRUE | TRUE | TRUE | TRUE | United States | 5431 |
| TRUE | 0 | TRUE | TRUE | TRUE | TRUE | United States | 5431 |
| TRUE | 0 | TRUE | TRUE | TRUE | TRUE | United States | 5431 |
| TRUE | 1 | FALSE | TRUE | TRUE | FALSE | United States | 5431 |
| TRUE | 0 | TRUE | TRUE | TRUE | TRUE | United States | 5431 |

The machine learning algorithm, e.g., security risk model 105, may be trained on data from a plurality of test devices, such that the machine learning algorithm may be used to identify the one or more vulnerable security configurations 162 that render the plurality of client devices 110 as at-risk client devices 160. In other words, the security risk model 105 may compare the security configuration of each client device, as identified by the security configuration information, with one or more known security configurations that respectively place the client device 110 in one of one or more vulnerable security states 140. In this way, the security manager server 130 and/or security risk correlator 134 may identify the at-risk client devices 160. In this way, the security manager server 130 and/or security risk correlator 134 may attribute the vulnerable security state 140 of a client device 110 to its device configuration. Using this correlation, the security manager server 130 and/or security risk correlator 134 may identify the one or more vulnerable security configurations 162 that render at-risk client devices 160 susceptible to one or more security risks. In some implementations, a confidence in this attribution may be measured based on how significant this correlation is statistically, e.g., is the correlation observed on large sample of client devices from an overall device population. The security risk model 105 may include or be based on one or more machine learning algorithms, such as but not limited to, a multiclass decision forest, one or more deep neural networks, or temporal-based machine learning algorithms, although it should be understood by those of ordinary skill in the arts that other machine learning algorithms are also contemplated in accordance with implementations of the present disclosure.

In another further optional implementation, at 415, calculating a vulnerability score 144 for each of the plurality of client devices 110 based on the infection pattern 142 for each of the plurality of client devices 110, and wherein the vulnerable security state 140 associated with each of the sets of at-risk client devices 160 is based on the respective vulnerability score 144 of each of the plurality of client devices 110. For example, in an implementation, to achieve this, the security manager server 130 and/or security risk correlator 134 may, for example, use a trained and/or untrained machine learning algorithm, e.g., security risk model 105, to generate the vulnerability score 144 of the plurality of client devices 110 based on vulnerable security states of a plurality of training devices. In further implementations, the vulnerability score 144 of the plurality of client devices 110 based on customized levels received from a user. The vulnerability score 114 may be based on a scale from 0 to 100, and client devices 110 having a score over a first threshold may be have a high vulnerability, devices having a score between the first threshold and a second threshold may have a moderate vulnerability, and devices having a score below the second threshold may have a low vulnerability. Although the present example is based on three levels of vulnerability, it should be understood by those of ordinary skill in the arts that any number of levels of vulnerability are also contemplated in accordance with aspects of the present disclosure.

Figure 13:
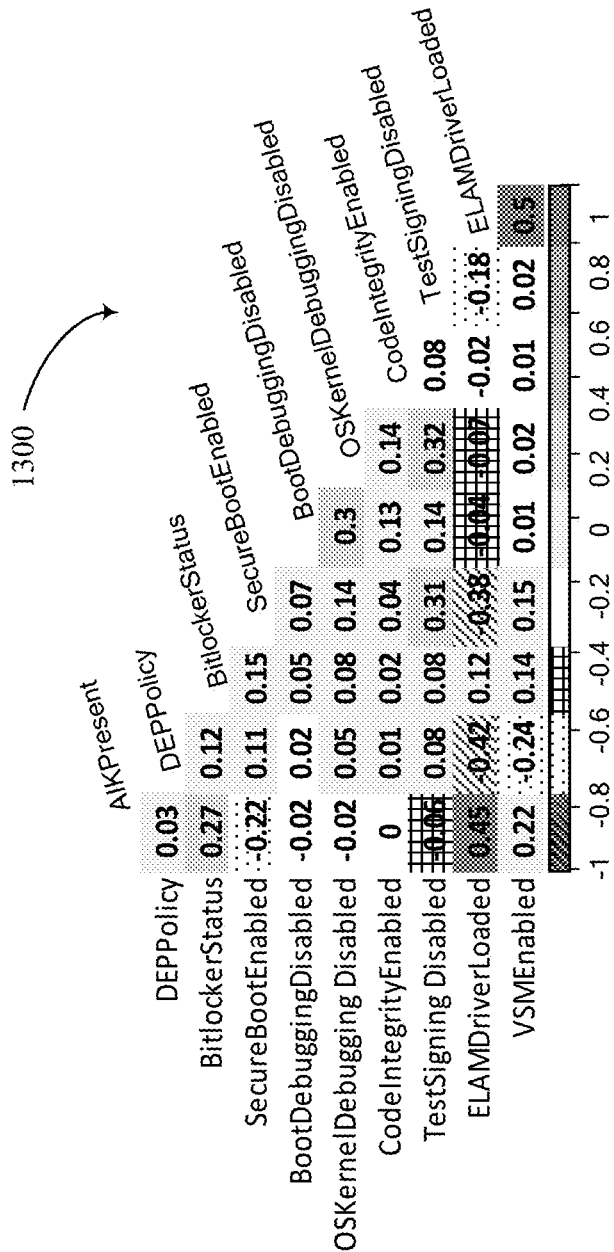
FIG. 13 is an example of chart illustrating inter-correlations of sample parameters in accordance with an implementation of the present disclosure.

Referring back to FIG. 2, at 225, method 200 may further include determining a configuration update 165 for at least one vulnerable security configuration, wherein the configuration update 165 changes one or more configuration parameters of the security configuration information 125 of each corresponding at-risk client device 160 to reduce or eliminate the corresponding vulnerable security state. For example, in an implementation, the security manager server 130 and/or configuration updater 136 may identify one or more security parameters of each of the at-risk devices 160 that may be modified to increase a security of each of the at-risk devices 160. To achieve this, the security manager server 130 and/or configuration updater 136 may determine an inter-correlation 164 between the security parameters that may be used to determine whether a combination of two or more security parameters, hardware features, software feature, and/or firmware features increases, decreases, or has no effect on the security of the at-risk devices 160. For example, as illustrated in FIG. 13, the inter-correlation 164 may be scored with any value between, for example, −1 to 1. In some instances, a score close to 0 indicates that there is no significant correlation between the combination of parameters, a score closer to −1 indicates the combination of parameters are not correlated to one another, and a score closer to 1 indicates the combination of parameters are correlated to one another. Although the inter-correlation is described as being scored with any value between −1 to 1, those of ordinary skill in arts would understand that this is merely an example, and other scales for scoring the inter-correlation 164 are also contemplated in accordance with aspects of the present disclosure. Thus, the inter-correlation 164 between the security parameters may be used, for example, to determine the configuration update 165 for a given client device. For example, the security manager server 130 and/or configuration updater 136 may identify which combination of parameters provides for increased security of the at-risk devices.

Also, at 230, method 200 may further include initiating applying the configuration update 165 to each of the at-risk client devices 160 corresponding to the at least one vulnerability security configuration. For example, in an implementation, the security manager server 130 and/or configuration updater 136 may transmit update instructions 166 to each of the at-risk devices 160 that includes instructions for enabling/disabling one or more security parameters based on the inter-correlation 164 and the security configuration information 125 of the at-risk device 160. As a result, the at-risk device 160 may update the security configuration information 125 to enable, disable, or change attributes of one or more security parameters to increase security of the device.

Optionally, at 225, method 200 may further include outputting a report of at least a portion of the one or more sets of at-risk client devices 160 and the associated ones of the one or more vulnerable security states 140. For example, in an implementation, the security manager server 130 and/or report generator 138 may generate a risk report 170 based on correlations between the different security configuration information 125 and the vulnerable security state 140 of the plurality of client devices 110. In some implementations, the risk report 170 may be customized in accordance with user requirements. FIGS. 9-12 illustrate different sample risk reports 170.

Figure 9:
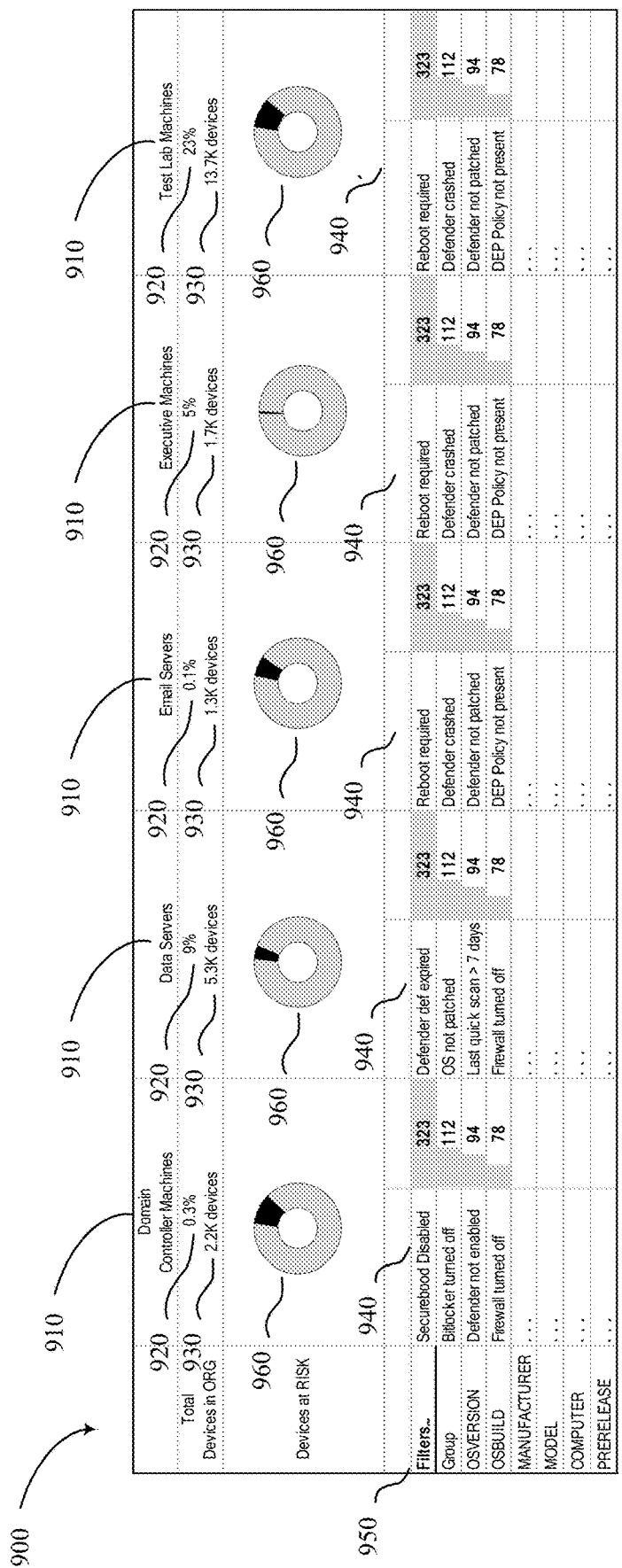

For example, FIG. 9 illustrates an example risk report 900 that includes categories 910 for the plurality of client devices 110 according to a type of the client device 110, e.g., domain controller machines, data servers, email servers, executive machines, test lab machines, etc., a percentage of at-risk devices 160 in each category 920, a total number of client devices 110 in each category 930, a breakdown of the device configuration of the client devices 110 identified as being at risk 940, and a graph 960 to illustrate the percentage of the at-risk devices 160. For example, the breakdown may indicate whether a given security parameter, hardware features, software feature, and/or firmware features was enabled/disabled and the number of devices having such a configuration. In some implementations, an order of the security parameter, hardware features, software feature, and/or firmware features may be based on an importance of the security parameter in providing protection to the plurality of client devices 110. For example, using the machine learning algorithms, the report generator 138 may rank the security parameters based on the protection afforded to the plurality of client devices 110. In further implementations, the report may include filters 950 to filter the plurality of client devices 110 by, for example, the operating system version of the client device, make and model of the client device, or software installed on the client device, category of the client device, location of the client device, etc.

In another example, referring to FIG. 10, a risk report 1000 may include categories 1010 of the plurality of client devices 110 according to a business impact of the client device 110, a percentage of at-risk devices 160 in each category 1020, a total number of client devices 110 in each category 1030, a breakdown of the device configuration of the client devices identified as being at risk 1040, and filters 1050 to filter the plurality of client devices 110.

In another example, referring to FIG. 11, a risk report 1100 may include categories 1110 of the plurality of client devices 110 according the vulnerability level of the client device 110, a percentage of at-risk devices 160 in each category 1120, a breakdown of the device configuration of the client devices 110 identified as being at risk 1140, filters 1150 to filter the plurality of client devices 110, and a graph 1160 to illustrate a percentage of the at-risk devices 160. The report 1100 may also include a list of most compromised devices 1170 for each category, with the list 1170 including a device name 1172 and a number of harmful items detected on each device 1172.

Figure 12:
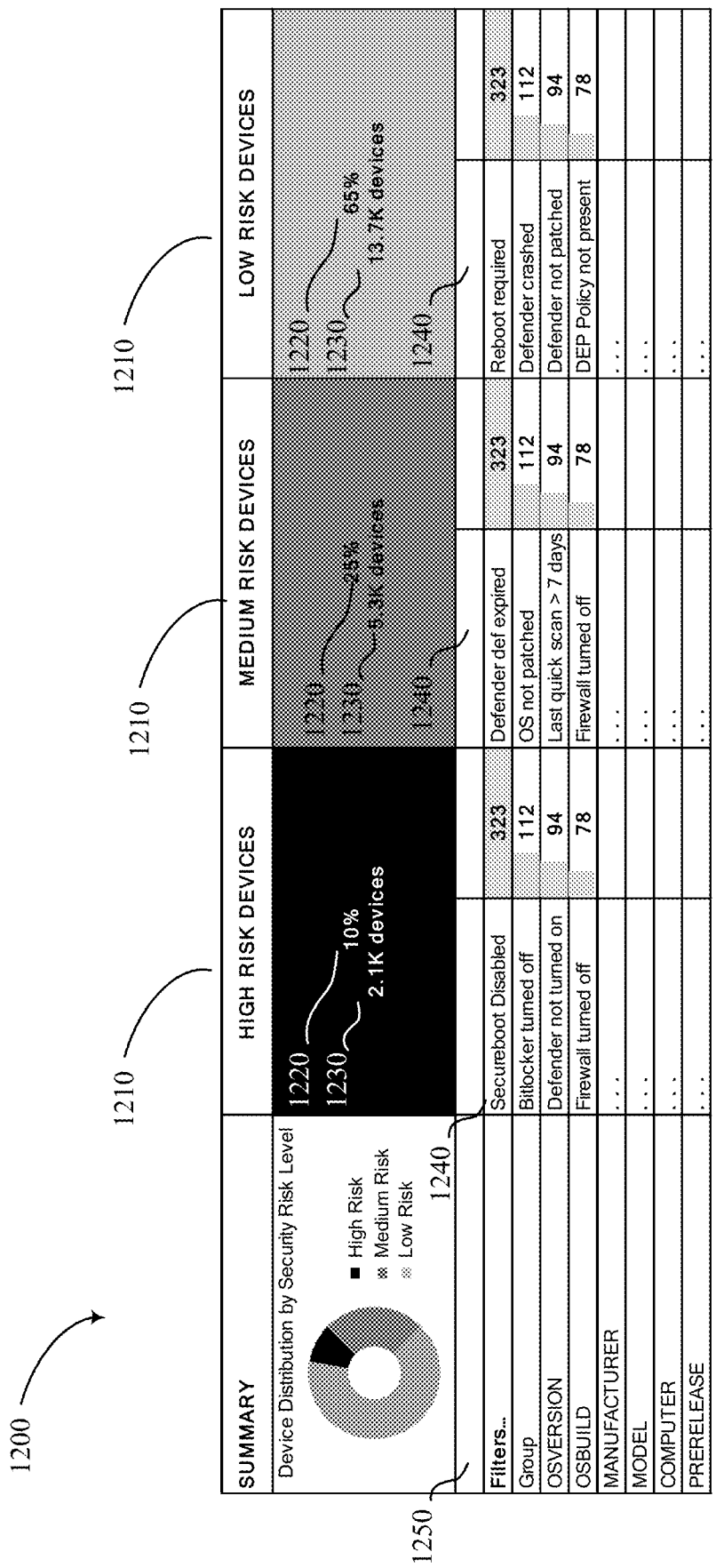

In another example, referring to FIG. 12, a risk report 1200 may include categories 1210 of the plurality of client devices 110 according the vulnerability level of the client device 110, a percentage of at-risk devices 160 in each category 1220, a total number of client devices 110 in each category 1230, a breakdown of the device configuration of the client devices 110 identified as being at risk 1240, and filters 1250 to filter the plurality of client devices 110.

The security manager server 130 may also include a memory configured for storing data and/or computer-executable instructions defining and/or associated with an operating system 106, and a processor that may execute the operating system. As an example, the memory can include, but is not limited to, a type of memory usable by a computer, such as random access memory (RAM), read only memory (ROM), tapes, magnetic discs, optical discs, volatile memory, non-volatile memory, and any combination thereof. As an example, the processor can include, but is not limited to, any processor specially programmed as described herein, including a controller, microcontroller, application specific integrated circuit (ASIC), field programmable gate array (FPGA), system on chip (SoC), or other programmable logic or state machine. Processor and/or memory may execute code that defines the functionality described herein to attribute security vulnerabilities to a configuration of a client device.

Figure 6:
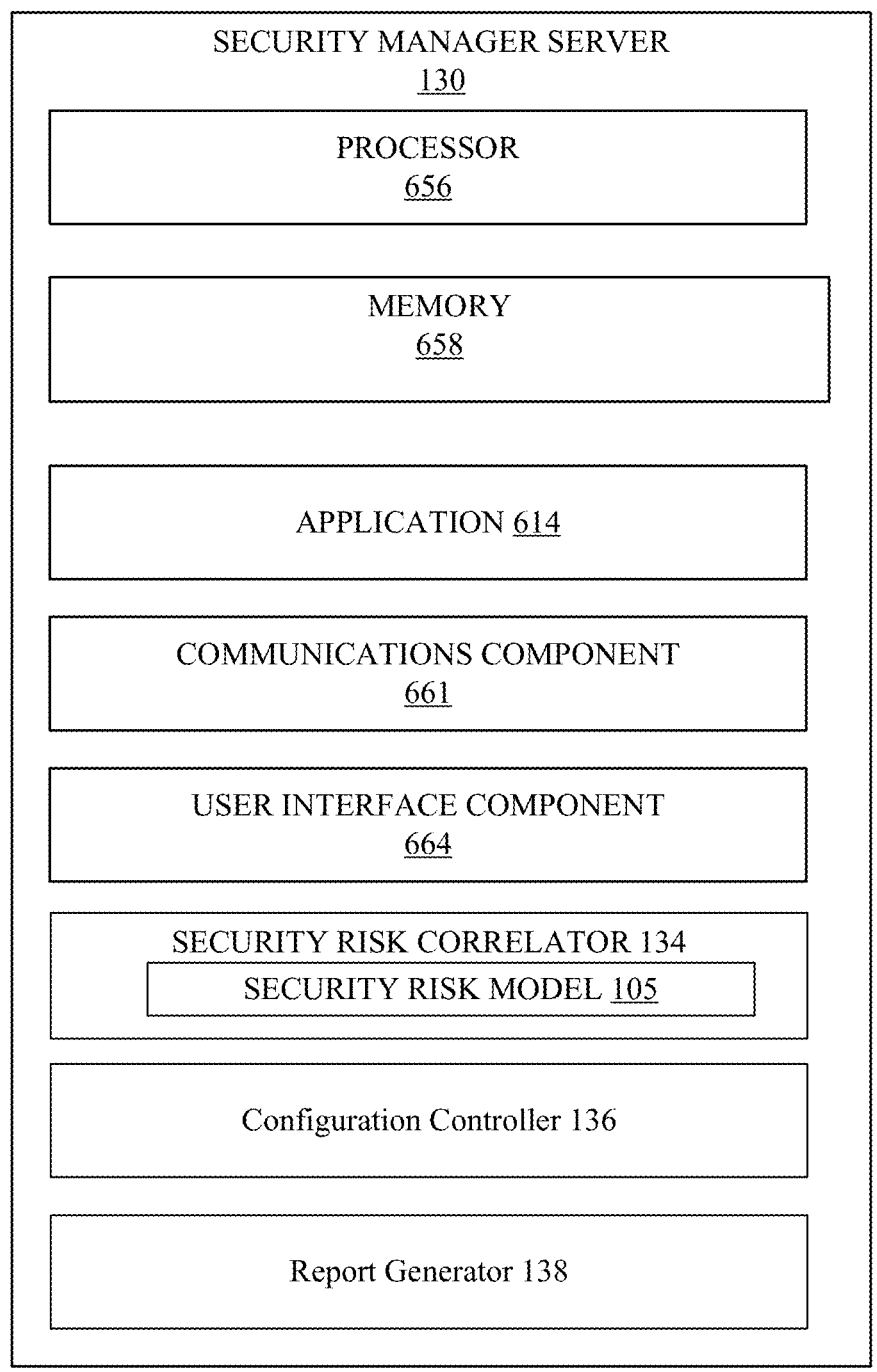
FIG. 6 is a schematic block diagram of an example security manager server in accordance with an implementation of the present disclosure.

Referring now to FIG. 6, an example security manager sever 130 in accordance with an implementation includes additional component details as compared to FIGS. 1 and 5. In such situations, the term "server" may also refer to stand alone device(s) such as, desktops, laptops, smart phones, or tablets. In one example, the security manager sever 130 may include processor 656 for carrying out processing functions associated with one or more of components and functions described herein. Processor 656 can include a single or multiple set of processors or multi-core processors. Moreover, processor 656 can be implemented as an integrated processing system and/or a distributed processing system.

The security manager sever 130 may further include memory 658, such as for storing local versions of applications being executed by processor 656. Memory 658 can include a type of memory usable by a computer, such as random access memory (RAM), read only memory (ROM), tapes, magnetic discs, optical discs, volatile memory, non-volatile memory, and any combination thereof. Additionally, processor 656 and memory 658 may include and execute an operating system.

Further, security manager sever 130 may include a communications component 661 that provides for establishing and maintaining communications with one or more parties utilizing hardware, software, and services as described herein. Communications component 661 may carry communications between components on the security manager sever 130, as well as between the security manager sever 130 and external devices, such as devices located across a communications network and/or devices serially or locally connected to the security manager sever 130. For example, communications component 661 may include one or more buses, and may further include transmit chain components and receive chain components associated with a transmitter and receiver, respectively, operable for interfacing with external devices.

The security manager sever 130 may also include a user interface component 664 operable to receive inputs from a user of the security manager sever 130 and further operable to generate outputs for presentation to the user. User interface component 664 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 664 may include one or more output devices, including but not limited to a display, a speaker, a haptic feedback mechanism, a printer, any other mechanism capable of presenting an output to a user, or any combination thereof. In an implementation, user interface component 664 may transmit and/or receive messages corresponding to the operation of applications 614.

The security manager server 130 may also include the security risk correlator 134 that may receive the security configuration information 125 and the malware state information 121 from the plurality of client devices 110, attestation server 120, and/or antivirus server 180, respectively. The security risk correlator 134 may also execute the security risk model 105 to determine one or more sets of at-risk client devices 160 each having a corresponding vulnerable security configuration 162 and a corresponding vulnerable security state 140. Determining the vulnerable security state 140 for each vulnerable security configuration by determining an infection pattern 142 for each of the plurality of client devices 110, and the security risk correlator 134 may use the infection pattern 142 of each of the plurality of client devices 110 to identify the at-risk client devices 160 based on the vulnerable security state 140 of each client device 110. To achieve this, the security risk correlator 134 may execute the security risk model 105 to group the plurality of client devices 110 based on a number of unique malware files m, a number of malware families f, and a number of days malware files were detected on a client device dmax, which may be based on a period for determining the pattern of infection 142. The security risk correlator 134 may execute the security risk model 105 to create a dataset 150 including the security configuration information 125 of each of the plurality of client devices 110, a unique identifier 152 of each of the plurality of client devices 110, and the infection pattern 142 of each of the plurality of client devices 110 by merging the first and second security data profiles 112, 128 based on the correlation ID 126, and merging the first security profile data 112 with the malware state information 121 to uniquely identify each client device 110. The security risk correlator 134 may apply a machine learning algorithm to the dataset 150 to determine a correlation 154 between the vulnerable security state 140 of each of the plurality of client devices and the security configuration information 125 of each of the plurality of client devices 110. As a result, the security risk correlator 134 may attribute the vulnerable security state 140 of a client device 110 to its device configuration. Using this correlation, the security risk correlator 134 may identify the one or more vulnerable security configurations 162 that render at-risk client devices 160 susceptible to one or more security risks. The security risk correlator 134 may also use a trained and/or untrained machine learning algorithm to generate the vulnerability score 144 of the plurality of client devices 110 based on vulnerable security states of a plurality of training devices.

The security manager server 130 may also include a configuration updater 136 that may identify one or more security parameters of each of the at-risk devices 160 that may be modified to increase a security of each of the at-risk devices 160. To achieve this, configuration updater 136 may determine an inter-correlation 164 between the security parameters that may be used to determine whether a combination of two or more security parameters, hardware features, software feature, and/or firmware features increases, decreases, or has no effect on the security of the at-risk devices 160. Using the inter-correlator 164, the configuration updater 136 may identify which combination of parameters provides for increased security of the at-risk devices. The configuration updater 136 may transmit update instructions 166 to each of the at-risk devices 160 that includes instructions for enabling/disabling one or more security parameters based on the inter-correlation 164 and the security configuration information 125 of the at-risk device 160. As a result, the at-risk device 160 may update the security configuration information 125 to enable/disable one or more security parameters to increase security of the device.

In some implementations, the security manager server 130 may also include report generator 138 that generates a risk report 170 based on correlations between the different security configuration information 125 and the vulnerable security state 140 of the plurality of client devices 110. In some implementations, the risk report 170 may be customized in accordance with user requirements. In this way, the risk report 170 may summarize and/or present the correlations between the different security configuration information 125 and the vulnerable security state 140 of the plurality of client devices 110 based on the user requirements, thereby providing for a more efficient user interface to access relevant information.

Referring now to FIG. 7, an example client device 110 in accordance with an implementation includes additional component details as compared to FIGS. 1 and 5. In such situations, the term "client device" may also refer to stand alone device(s) such as, desktops, laptops, smart phones, or tablets. In one example, the client device 110 may include processor 756 for carrying out processing functions associated with one or more of components and functions described herein. Processor 756 can include a single or multiple set of processors or multi-core processors. Moreover, processor 756 can be implemented as an integrated processing system and/or a distributed processing system. In some implementations, processor 756 may execute the configuration update 165 received from the security manager server 130 to activate one or more security parameters.

The client device 110 may further include memory 758, such as for storing local versions of applications being executed by processor 756. Memory 758 can include a type of memory usable by a computer, such as random access memory (RAM), read only memory (ROM), tapes, magnetic discs, optical discs, volatile memory, non-volatile memory, and any combination thereof. Additionally, processor 756 and memory 758 may include and execute an operating system.

The client device 110 may also include a TPM 766 that, during each boot of the client device 110, may store, in memory 758, boot data in an encrypted format hashed by a private key sealed inside the TPM, and a communications component 761 may be used to transmit the boot data to, for example, the attestation server 120.

Further, client device 110 may include the communications component 761 that provides for establishing and maintaining communications with one or more parties utilizing hardware, software, and services as described herein. Communications component 761 may carry communications between components on the client device 110, as well as between the client device 110 and external devices, such as devices located across a communications network and/or devices serially or locally connected to the client device 110. For example, communications component 761 may include one or more buses, and may further include transmit chain components and receive chain components associated with a transmitter and receiver, respectively, operable for interfacing with external devices. In some implementations, the communications component 761 may be used to communicate with the attestation 120 and/or the security manager server 130.

The client device 110 may also include a user interface component 764 operable to receive inputs from a user of the client device 110 and further operable to generate outputs for presentation to the user. User interface component 64 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 764 may include one or more output devices, including but not limited to a display, a speaker, a haptic feedback mechanism, a printer, any other mechanism capable of presenting an output to a user, or any combination thereof. In an implementation, user interface component 764 may transmit and/or receive messages corresponding to the operation of applications 714.

The client device 110 may also include a security manager 768 component that includes a security monitor component 770 for storing and/or updating the security configuration information 125 and a malware monitor component 772 for monitoring the malware present on the client device 110.

Figure 8:
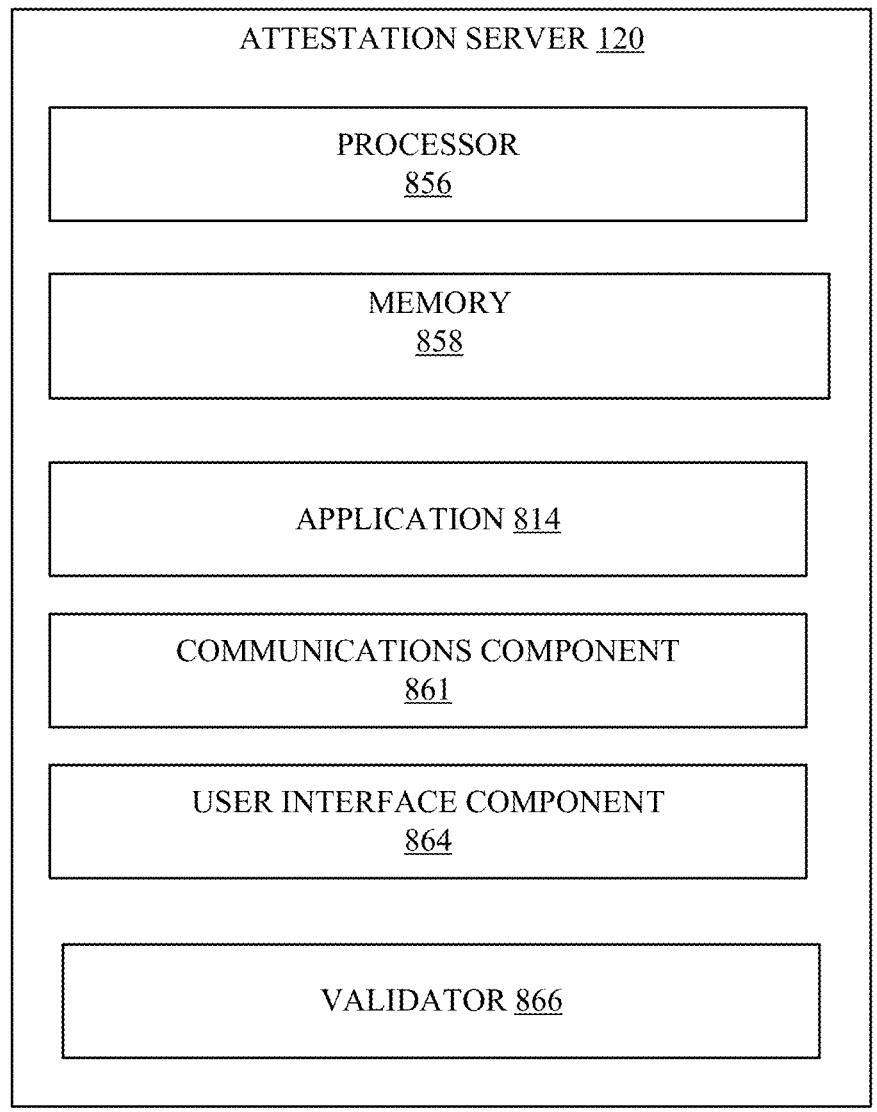
FIG. 8 is a schematic block diagram of an example attestation server in accordance with an implementation of the present disclosure.

Referring now to FIG. 8, an example attestation server 120 in accordance with an implementation includes additional component details as compared to FIGS. 1 and 5. In such situations, the term "server" may also refer to stand alone device(s) such as, desktops, laptops, smart phones, or tablets. In one example, the attestation server 120 may include processor 856 for carrying out processing functions associated with one or more of components and functions described herein. Processor 856 can include a single or multiple set of processors or multi-core processors. Moreover, processor 856 can be implemented as an integrated processing system and/or a distributed processing system.

The attestation server 120 may further include memory 858, such as for storing local versions of applications being executed by processor 856. Memory 858 can include a type of memory usable by a computer, such as random access memory (RAM), read only memory (ROM), tapes, magnetic discs, optical discs, volatile memory, non-volatile memory, and any combination thereof. Additionally, processor 856 and memory 858 may include and execute an operating system.

Further, attestation server 120 may include a communications component 861 that provides for establishing and maintaining communications with one or more parties utilizing hardware, software, and services as described herein. Communications component 861 may carry communications between components on the attestation server 120, as well as between the attestation server 120 and external devices, such as devices located across a communications network and/or devices serially or locally connected to the attestation server 120. For example, communications component 861 may include one or more buses, and may further include transmit chain components and receive chain components associated with a transmitter and receiver, respectively, operable for interfacing with external devices.

The attestation server 120 may also include a user interface component 864 operable to receive inputs from a user of the attestation server 120 and further operable to generate outputs for presentation to the user. User interface component 864 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 864 may include one or more output devices, including but not limited to a display, a speaker, a haptic feedback mechanism, a printer, any other mechanism capable of presenting an output to a user, or any combination thereof. In an implementation, user interface component 864 may transmit and/or receive messages corresponding to the operation of applications 814.

The attestation server 120 may also include a validator 866 that may verify that boot data from client device 110 matches a value computed from individual security parameters on client device 110. Once the attestation server 120 determines that the boot data 12 is trustworthy, the validator 866 may encrypt the boot data 12 and send the boot data 12 back to a respective client device 110, as well as the security manager server 130.

Figure 14:
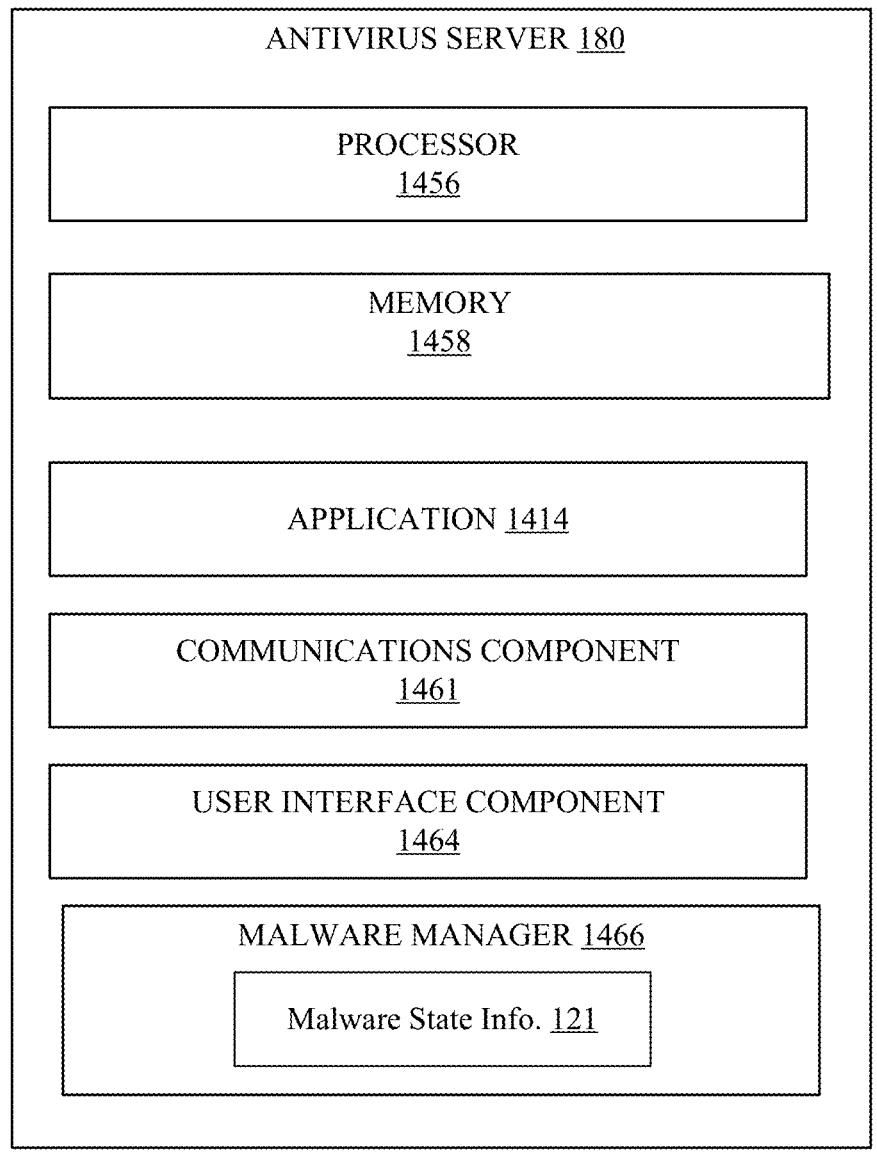
FIG. 14 is a schematic block diagram of an example antivirus server in accordance with an implementation of the present disclosure.

Referring now to FIG. 14, an example antivirus server 180 in accordance with an implementation includes additional component details as compared to FIGS. 1 and 5. In such situations, the term "server" may also refer to stand alone device(s) such as, desktops, laptops, smart phones, or tablets. In one example, the antivirus server 180 may include processor 1456 for carrying out processing functions associated with one or more of components and functions described herein. Processor 1456 can include a single or multiple set of processors or multi-core processors. Moreover, processor 1456 can be implemented as an integrated processing system and/or a distributed processing system.

The antivirus server 180 may further include memory 1458, such as for storing local versions of applications being executed by processor 1456. Memory 1458 can include a type of memory usable by a computer, such as random access memory (RAM), read only memory (ROM), tapes, magnetic discs, optical discs, volatile memory, non-volatile memory, and any combination thereof. Additionally, processor 1456 and memory 1458 may include and execute an operating system.

Further, antivirus server 180 may include a communications component 1461 that provides for establishing and maintaining communications with one or more parties utilizing hardware, software, and services as described herein. Communications component 1461 may carry communications between components on the antivirus server 180, as well as between the antivirus server 180 and external devices, such as devices located across a communications network and/or devices serially or locally connected to the antivirus server 180. For example, communications component 1461 may include one or more buses, and may further include transmit chain components and receive chain components associated with a transmitter and receiver, respectively, operable for interfacing with external devices.

The antivirus server 180 may also include a user interface component 1464 operable to receive inputs from a user of the antivirus server 180 and further operable to generate outputs for presentation to the user. User interface component 1464 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1464 may include one or more output devices, including but not limited to a display, a speaker, a haptic feedback mechanism, a printer, any other mechanism capable of presenting an output to a user, or any combination thereof. In an implementation, user interface component 1464 may transmit and/or receive messages corresponding to the operation of applications 1414.

The antivirus server 180 may also include a malware manager 1466 that may collect the malware state information 121 for each of the plurality of client devices 110.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. It should be understood by those of ordinary skill in the art that these are merely examples, and that other processors are further contemplated in accordance with aspects of the disclosure. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for controlling security risks on client devices, comprising:
    receiving security configuration information for a plurality of client devices, the security configuration information comprising identification of at least one of security parameters, hardware configurations, or software configurations of each of the plurality of client devices;
    receiving malware state information for one or more first client devices of the plurality of client devices, the malware state information comprising identification of at least one or more types of malware on the one or more first client devices;
    analyzing, based on the security configuration information and the malware state information for the one or more first client devices, the security configuration information and the malware state information for each of the plurality of client devices to identify which one or more second client devices from the plurality of client devices having a security configuration that places the one or more second client devices in a vulnerable security state; and
    transmitting a configuration update to the one or more second client devices to avoid the malware associated with the malware state information on the one or more first client devices in response to the one or more second client devices being in the vulnerable security state.

2. The method of claim 1, further comprising:
    generating an output that includes the one or more second client devices.

3. The method of claim 1, further comprising:
    determining the configuration update for at least one vulnerable security state, wherein the configuration update changes one or more configuration parameters of the security configuration information of each of the one or more second client devices to reduce or eliminate the at least one vulnerable security state; and initiating the transmitting the configuration update to each of the one or more second client devices in response to the determining the configuration update.

4. The method of claim 1, further comprising:
determining a plurality of groups of the one or more second client devices based on the vulnerable security state of each of the one or more second client devices.

5. The method of claim 1, wherein the analyzing comprises comparing the security configuration information for each of the plurality of client devices to known security configurations that place the one or more second client devices in the vulnerable security state.

6. The method of claim 1, wherein at least one of receiving the security configuration information and receiving the malware state information comprises receiving secure information.

7. The method of claim 6, wherein receiving the secure information comprises:
receiving first security profile data from each of the plurality of client devices, wherein the first security profile data includes at least one of the security configuration information and the malware state information from each of the plurality of client devices, wherein the first security profile data is based on a message exchange by each of the plurality of client devices with an attestation server and is an encrypted, client-side version of the at least one of the security configuration information and the malware state information; and
receiving second security profile data from the attestation server for each of the plurality of client devices, wherein the second security profile data includes at least one of the security configuration information and the malware state information from each of the plurality of client devices, wherein the second security profile data is based on the message exchange by the attestation server with each of the plurality of client devices and is an encrypted, server-side version of the at least one of the security configuration information and the malware state information.

8. The method of claim 1, further comprising:
determining the vulnerable security state for each security configuration by determining an infection pattern for each of the one or more first client devices based on one or more of a number of types of malware files present on each of the one or more first client devices, a number of malware files present on each of the one or more first client devices, or a period of time the malware files have been present on each of the one or more first client device; and
associating one or more sets of infection patterns with a corresponding one or more vulnerable security states.

9. The method of claim 8, further comprising:
calculating a vulnerability score for each of the one or more second client devices based on the infection pattern for each of the one or more first client devices, and wherein the vulnerable security state associated with each of the one or more second client devices is based on a respective vulnerability score of each of the one or more second client devices.

10. The method of claim 1, wherein the security configuration information includes a combination of one or more of hardware characteristics, firmware characteristics, software characteristics, or the security parameters.

11. A computer device for controlling security risks on client devices, comprising:
a memory to store data and instructions; and
a processor in communication with the memory to execute the instructions to:
receive security configuration information for a plurality of client devices, the security configuration information comprising identification of at least one of security parameters, hardware configurations, or software configurations of each of the plurality of client devices;
receive malware state information for one or more first client devices of the plurality of client devices, the malware state information comprising identification of at least one or more types of malware on the one or more first client devices;
analyze, based on the security configuration information and the malware state information for the one or more first client devices, the security configuration information and the malware state information for of the plurality of client devices to identify one or more second client devices from the plurality of client devices having a security configuration that places the one or more second client devices in a vulnerable security state; and
transmit a configuration update to the one or more second client devices to avoid the malware associated with the malware state information on the one or more first client devices in response to the one or more second client devices being in the vulnerable security state.

12. The computer device of claim 11, wherein the instructions are further executable to:
generate an output that includes the one or more second client devices.

13. The computer device of claim 11, wherein the instructions are further executable to:
determine the configuration update for at least one vulnerable security state, wherein the configuration update changes one or more configuration parameters of the security configuration information of each of the one or more second client devices to reduce or eliminate the at least one vulnerable security state; and
initiate transmission of the configuration update to each of the one or more second client devices in response to determining the configuration update.

14. The computer device of claim 11, wherein the instructions are further executable to:
determine a plurality of groups of the one or more second client devices based on the vulnerable security state of each of the one or more second client devices.

15. The computer device of claim 11, wherein the instructions are further executable to:
compare the security configuration information for each of the plurality of client devices to known security configurations that place the one or more second client devices in the vulnerable security state.

16. The computer device of claim 11, wherein at least one of receiving the security configuration information and receiving the malware state information comprises receiving secure information.

17. The computer device of claim 16, wherein receiving the secure information comprises:
receiving first security profile data from each of the plurality of client devices, wherein the first security profile data includes at least one of the security configuration information and the malware state information from each of the plurality of client devices, wherein the first security profile data is based on a message exchange by each of the plurality of client devices with an attestation server and is an encrypted, client-side version of the at least one of the security configuration information and the malware state information; and receiving second security profile data from the attestation server for each of the plurality of client devices, wherein the second security profile data includes at least one of the security configuration information and the malware state information from each of the plurality of client devices, wherein the second security profile data is based on the message exchange by the attestation server with each of the plurality of client devices and is an encrypted, server-side version of the at least one of the security configuration information and the malware state information.

18. A computer-readable device storing instructions executable by one or more processors, the instructions comprising code for:

receiving security configuration information for a plurality of client devices, the security configuration information comprising identification of at least one of security parameters, hardware configurations, or software configurations of each of the plurality of client devices;

receiving malware state information for one or more first client devices of the plurality of client devices, the malware state information comprising identification of at least one or more types of malware the one or more first client devices;

analyzing, based on the security configuration information and the malware state information for the one or more first client devices, the security configuration information and the malware state information for of the plurality of client devices to identify one or more second client devices from the plurality of client devices having a security configuration that places the identified one or more second client devices in a vulnerable security state; and transmitting a configuration update to the one or more second client devices to avoid the malware associated with the malware state information on the one or more first client devices in response to the one or more second client devices being in the vulnerable security state.

19. The computer-readable device of claim 18, the instructions further comprising code for generating an output that includes the one or more second client devices.

20. The computer-readable device of claim 18, the instructions further comprising code for:

determining the configuration update for at least one vulnerable security state, wherein the configuration update changes one or more configuration parameters of the security configuration information of each of the one or more second client devices to reduce or eliminate the at least one vulnerable security state; and initiating transmission of the configuration update to each of the one or more second client devices in response to determining the configuration update.

\* \* \* \* \*